June 3, 1930.  T. A. M. PETERSEN  1,761,743
GAS TRAP
Filed Oct. 5, 1925
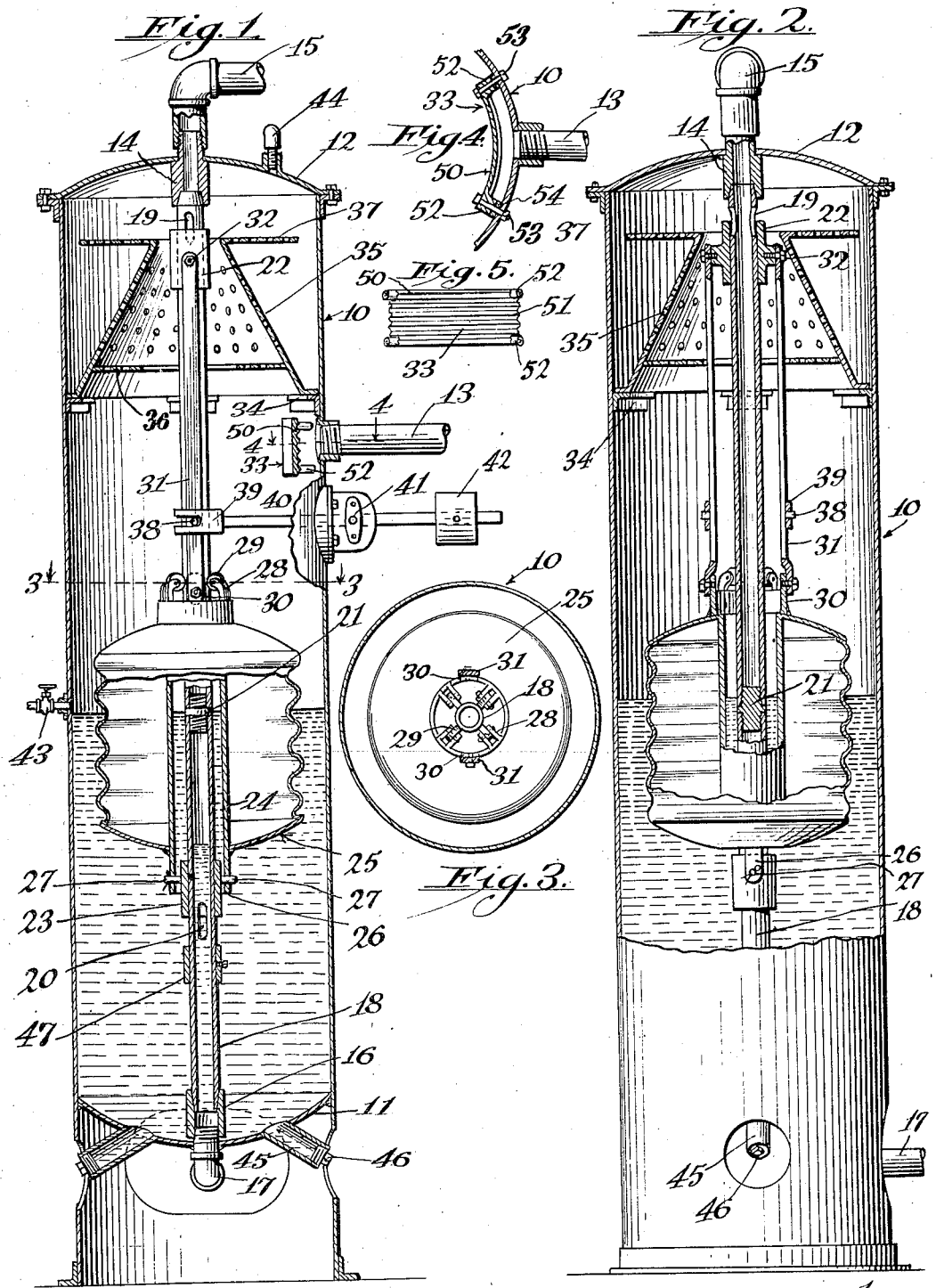
Inventor
T. A. M. Petersen
by Hazard and Miller
Attorneys Patented June 3, 1930

1,761,743

UNITED STATES PATENT OFFICE

THORVALD A. M. PETERSEN, OF LOS ANGELES, CALIFORNIA, ASSIGNOR TO UNION TANK & PIPE CO., OF LOS ANGELES, CALIFORNIA, A CORPORATION OF CALIFORNIA

GAS TRAP

Application filed October 5, 1925. Serial No. 60,640.

This invention relates to improvements in gas traps or gas and oil separators for separating the gas from the oil delivered from a well before the oil is discharged into a pipe line or into a storage tank.

An object of the invention is to provide an improved gas and oil separator which is simple in construction and which is efficient in operation.

Another object of the invention is to provide a gas and oil separator which may be readily disassembled for repair purposes.

Another object of the invention is to provide an oil and gas separator consisting essentially of a tank into which the mixed oil and gas is discharged and which has valve controlled outlets for the oil and gas with float means for actuating the valves and which has an indicator associated with the float for indicating its position and thus indicating approximately the proportions of gas and oil in the fluid delivered from the well.

Another object is to make a gas trap having a cylindrical shell mounted with its axis vertical and having a float guide or track mounted at its axis and a float loosely mounted to travel upon the float guide and having an anti-friction connection with track, so that the float may be large and powerful and having independent sleeve-valves for controlling outlets, said sleeve-valves being connected to the float and to each other by a universal joint construction or flexibly by pin joints.

Another object of the invention is to make a gas trap having a radial oil inlet and having a rough baffle directly in front of the oil inlet for the oil to strike against, said baffle being curved in plan and horizontally corrugated.

With the foregoing and other objects in view which will be made manifest in the following detailed description and specifically pointed out in the appended claims, reference is had to the accompanying drawings for an illustrative embodiment of the invention, wherein:

Figure 1 is a vertical section through the improved oil and gas separator,

Fig. 2 is a view similar to Fig. 1, being taken at right angles thereto, and

Fig. 3 is a horizontal section taken on the line 3—3 of Fig. 1.

Fig. 4 is a horizontal section on the line 4—4 of Fig. 1, showing the baffle plate.

Fig. 5 is a vertical elevation of a part of the device shown in Fig. 4, showing the face of the baffle plate.

Referring to the accompanying drawings wherein similar reference characters designate similar parts throughout, the improved oil and gas separator consists of a container formed of a cylindrical shell 10 having a concaved bottom 11 arranged some distance above its lower end and a removable cover 12. By having the bottom 11 above the bottom of the shell 10, the portion of the shell therebelow acts as a support for the container. An inlet pipe 13 is connected to the container and serves to admit the mixed gas and oil. In the cover 12 there is arranged a suitable fitting 14 to which a gas outlet pipe 15 is connected. At the bottom 11 there is arranged a similar fitting 16 to which an oil outlet pipe 17 is connected, this pipe extending through an aperture formed in the portion of the shell below the bottom 11. A pipe 18 is disposed centrally within the shell and has its ends slightly tapered to fit the fittings 14 and 16 so that the ends of the pipe are detachably connected to the gas outlet 15 and the oil outlet 17 respectively.

The pipe between the outlets 15 and 17 serves principally as a guide or track at the vertical axial center of the shell 10 and the float operated sleeve-valves and the float are mounted upon this track, so as to put the float in a central position where it may be of considerable size and power, and so that the sleeve-valves and float will run freely.

Adjacent the top and bottom of the pipe there are formed apertures 19 and 20 and intermediate these apertures the pipe is plugged, as indicated at 21. Sleeves 22 and 23 are slidable on the pipe 18 and serve to cover the apertures 19 and 20 respectively so as to close them. Around the pipe 18 there is arranged a section of seamless tubing 24, on which is built a container 25 serving as a float. This container is shown as having its side walls corrugated for strengthening purposes. On the bottom of the section of seamless tubing 24 there are formed lugs 26 which receive the ends of pins 27 on the lower sleeve 23 so as to pivotally connect the sleeve 23 to the float. On the upper end of the section of seamless tubing there are secured arms 28 carrying rollers 29 which roll upon the exterior surface of the pipe 18. Intermediate the arms 28 there are formed lugs 30 which are spaced 90° from the lugs 26. Links 31 are pivotally connected to the lugs 30 and extend upwardly and are pivotally connected to pins 32 provided upon the upper sleeve 22. In this manner it will be readily appreciated that the two sleeves are pivotally connected to the float and are rotatable upon axes at right angles to each other, thus forming a universal joint connection between the sleeves and float so that there will be no binding between the sleeves and the pipe 18. The float is very loose upon the track and does not contact with it except through anti-friction rollers.

Within the container immediately opposite the end of the inlet pipe 13 there is arranged a baffle plate 33, and angle irons 34 are mounted upon the interior of the shell 10 and serve to support a screen 35. This screen is shown as being frusto-conical in form and has an inwardly extending flange 36 adjacent its bottom and an outwardly extending flange 37 adjacent its top. Both flanges and the body of the screen are perforated. On the links 31 there are formed pins 38 which are pivotally connected to the arms of yoke 39. A lever 40 supports the yoke 39 and extends through the shell through a stuffing box 41 and carries an adjustable weight 42 on its outer end. A petcock 43 is mounted upon the side of the shell adjacent the normal fluid level within the container. On the cover 12 there is provided a safety valve 44. Sand outlets 45 are connected to the bottom 11 and extend downwardly and outwardly therefrom in an inclined position. These sand outlets are normally closed by plugs 46.

The operation and the advantages of the improved gas and oil separator are as follows: Oil and gas is discharged into the container through the inlet pipe 13 and strikes the baffle plate 33. This baffle plate serves to break up the oil, it being readily understood that there usually are lumps or masses of tar or extremely thick oil mixed with the oil which should be broken up. The breaking of the oil serves also to liberate the gas mixed with it. The oil falls to the bottom of the container and the gas collects adjacent the top of the container. Any bubbles which are formed by the breaking of the oil by the baffle plate 33 encounter the screen 35, which screen serves to break the surface tensions of the bubbles and separate or liberate the gas therefrom. The oil which collects at the bottom of the container enters the pipe 18 through the apertures 20 and passes outwardly through the outlet 17. The gas is withdrawn from the container by passing through the apertures 19 and passing into the outlet pipe 15.

Under normal conditions the float and the sleeves are in the position shown in Fig. 1. However, if the mixture of gas and oil discharged from the inlet pipe 13 is such that the gas is excessive, the fluid level within the container will fall, causing the float to lower and slide the sleeves 22 and 23 downwardly upon the pipe 18. The downward movement of the sleeves and the float is limited by means of a collar 47, and when in its lowermost position, the sleeve 23 completely covers and closes the apertures 20. In such position the sleeve 22 completely opens or uncovers the apertures 19 so that the excess of gas can readily escape therefrom. In a similar manner if the mixture of oil and gas admitted through the inlet pipe 13 is such that the quantity of gas is small, the fluid level will rise, lifting the float and causing the sleeve 22 to completely cover the apertures 19, and cause the sleeve 23 to completely open the apertures 20. Under such conditions the gas pressure within the container quickly builds up and serves to force the oil through the apertures 20, the pipe 18 and into the outlet 17. I find that the frusto-conical screen 35 is quite advantageous in that the apertures formed therein present sharp edges, which are engaged by the bubbles and these bubbles will be broken to liberate the gas and thus separate the gas and oil.

The upward and downward movement of the float is indicated by the position of the lever 40, which can be seen from the outside of the container. By noting the position of the arm, the relative proportions of the gas and oil in the incoming fluid can be approximately determined. This indicator can be calibrated by opening the pet-cock 43, and when the fluid or oil is even with the petcock, the position of the arm will be noted. Subsequently, in operation when the petcock 43 is closed, the height of the oil in the container can be ascertained by the position of the lever 40 relatively to the noted position.

An important feature of the construction is that air will be entrapped between the plug 21 and the apertures 20 when the separator is originally started in operation. This air acts as a cushion at the end of the stream of oil within the outlet pipe 17, so that if for any reason something should occur to produce water-hammer in the outlet pipe 17, the pipe will not be destroyed but the shock will be taken up by this air cushion. The sand outlets 45 are preferably inclined in the position shown on the drawing. I find that if the outlet is vertical or is radial with respect to the center of curvature of the concaved bottom 11, the sand will tend to bridge over the outlet. In the inclined position, however, this bridging tendency of the sand is greatly reduced and it is practically possible at all times to remove the sand from within the container.

It will be noted that the improved construction permits the device to be readily disassembled for purposes of repair. By removing the removable cover 12, the screen 35 can be readily taken out of the container, as it merely rests upon the angle irons 34. Also the pipe 18 may be lifted out of the fitting 16 and the float, sleeves and links will also come out with it. This is an important feature of the construction and is advantageous over other gas traps which require a practically complete tearing down of the construction in order to repair any part.

The baffle plate 33 is shown separately in Figs. 4 and 5 and is constructed of a curved plate 50 concentric with the shell 10 and having longitudinal corrugations 51 as shown in Fig. 5. The baffle plate is held spaced the proper distance from the shell by means of legs 52 having bolts 53 extending through the center of the legs and through the shell, the spacing of the baffle plate from the shell may thus be accomplished by the insertion or removal of washers 54 between the legs and the shell. This type of baffle plate functions to spread the oil and materially aid the separation of the gas therefrom.

From the above it will be appreciated that an improved gas trap is provided, which is simple in construction and which is efficient in operation.

It will be understood that various changes may be made in the detail of construction without departing from the spirit or scope of the invention as defined by the appended claims.

I claim:

1. An oil and gas separator comprising a container, means forming an inlet to the container, means forming gas and oil outlets from the container adjacent its top and bottom respectively, a pipe disposed within the container having its ends connected to the outlets, there being apertures formed in the pipe adjacent its top and bottom respectively, sleeves slidable upon the pipe adapted to close said apertures, a float arranged about said pipe and movable thereon, and means pivotally connecting the float to the sleeves so that the sleeves may be actuated thereby, said sleeves being pivoted for rotation upon axes at right angles to each other so that a universal connection is provided between the sleeves.

2. A gas trap comprising a shell having a removable cover, means providing an inlet to said shell, means providing a liquid outlet from said shell adjacent the bottom thereof, means providing a gas outlet from said shell in said removable cover, a tube having a partition therein and having its ends detachably connected to said outlets, there being apertures in said tube above and below said partition, sleeve valves for opening and closing said apertures, a float, and arms connecting the float to the sleeve valves, there being pins on said arms and a counter-balance weight pivotally mounted upon the side of the shell having an arm provided with a fork, the arms of which are slotted from their outer ends inwardly so as to receive said pins through the outer ends.

3. In a gas trap, a screen comprising a frusto-conical part, an inwardly extending flange extending inwardly from adjacent the bottom of said frusto-conical part, and an outwardly extending flange extending outwardly from adjacent the top of said frusto-conical part, said part and flanges being perforated.

In testimony whereof I have signed my name to this specification.

THORVALD A. M. PETERSEN.